Patented Aug. 18, 1942

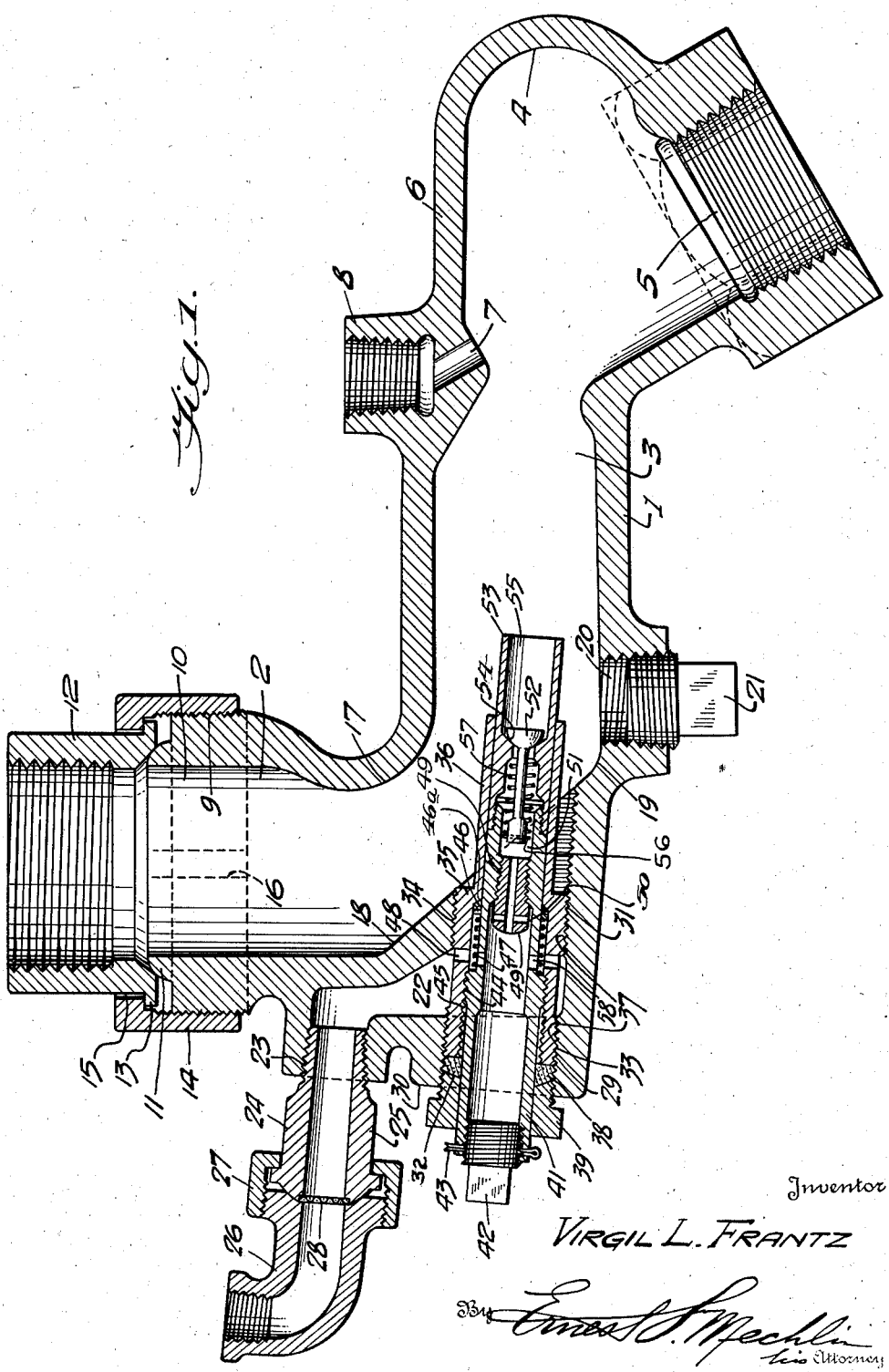

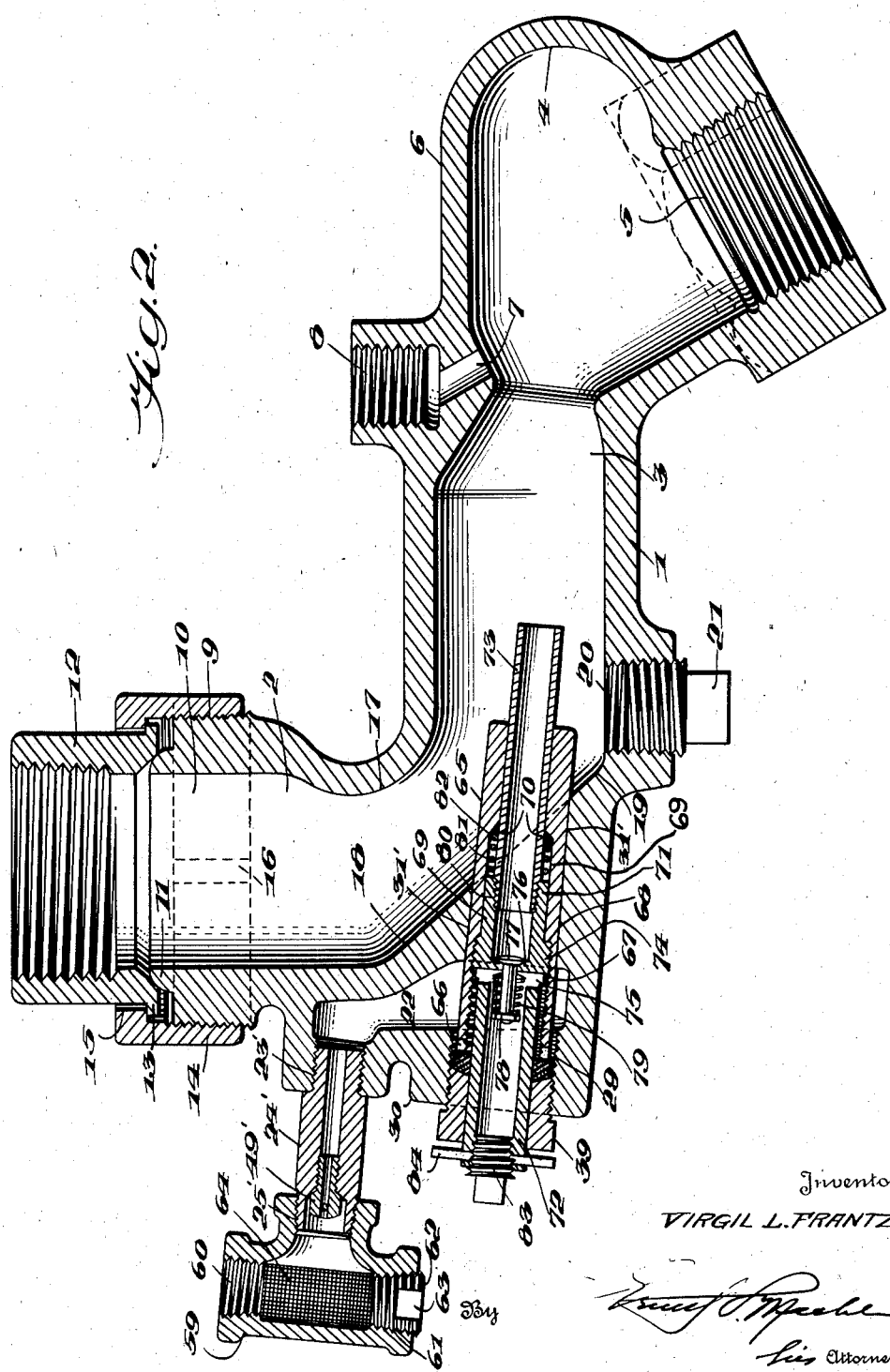

2,293,129

UNITED STATES PATENT OFFICE 2,293,129

SAND TRAP NOZZLE

Virgil L. Frantz, Roanoke, Va.

Application March 14, 1941, Serial No. 383,441

6 Claims. (Cl. 291—11)

The invention relates to sander mechanism for locomotives and the like and more particularly to an improved form of sand trap nozzle for use with sanding devices.

The principal object of the invention, generally stated, is to provide a sand trap of simple construction and to combine therewith a nozzle through which the sanding blast is adapted to be projected, the said nozzle being adjustable while the normal sanding blast is passing therethrough.

Another object of the invention is to provide an improved form of sand trap nozzle which may be adjusted during the normal operation of the sanding device and which does not require the removal of pipes or other connections or parts to permit the adjustment of the same.

Still another object of the invention is to provide a sand trap in which the air for operating the trap is entered at a point above the nozzle and passes through a strainer, the said air being adapted to enter the nozzle through special openings provided therein, said openings being so arranged and positioned as to permit the nozzle to be adjusted, thereby varying the sand flow from the discharge pipe of the trap through a wide range without in any way affecting the entry of air into the nozzle proper.

Still another object of the invention is to provide, in connection with a sand trap and adjustable nozzle, a housing member adapted to be secured to the trap in a fixed position, a portion thereof extending into the trap and affording a guiding surface for the nozzle proper.

Still another object of the invention is to provide an air strainer for use in connection with the improved nozzle and to so position and arrange the air strainer that the same may be cleaned by the removal of a plug with the strainer in position and by utilizing the normal air supply.

Still another object of the invention is to provide a seal between the nozzle and tube and housing to prevent leakage of air between the exterior of the nozzle tube and the housing proper.

To these and other ends the invention comprises the various elements and combinations thereof as illustrated in the accompanying drawings and as hereinafter described.

Figure 1 is a vertical longitudinal sectional view of one form of my improved trap and nozzle construction.

Figure 2 is a corresponding longitudinal cross sectional view illustrating the same improved form of trap but illustrating certain modifications in the nozzle and strainer construction.

Before describing the invention in detail it might be advisable to point out that heretofore all sanding nozzle adjustments have necessitated cutting off of the air supply from the sand trap and have in a large number of instances involved also the necessity of cutting off the supply of sand and of draining the sand trap of its contained sand. The cutting off of the supply of actuating air means that the adjustment of the nozzle is a matter of cut and try. That is to say, after each adjustment the actuating air has to be admitted and the flow of sand and its delivery to the rail observed. Where the adjustment of the nozzle not only requires the shutting off of the actuating air but also the complete draining of the sand trap the difficulty in making proper adjustment is materially increased. All of these difficulties and annoyances are obviated by using the form of sand trap nozzle illustrated in either of the figures of the drawings of this application.

The amount of sand delivered by any individual sand trap of the type disclosed herein and by practically all sand traps now on the market depends upon the distance the nozzle extends into the body of the trap. The greater the extension of the nozzle the less will be the flow of sand. To increase the flow of sand, therefore, the nozzle is retracted so as to increase the volume of the sand acted upon by the nozzle.

Carrying out my invention and referring first to Figure 1, I provide a sand trap 1 having an inlet leg 2 and a body 3, the latter terminating in a curved surface 4 and being provided with a discharge opening 5 positioned intermediate the end 4 and the inlet leg 2 and preferably at a point closely adjacent the lower end of the curved portion 4. At a point in alignment with the axis of the opening 5 I provide in the upper wall 6 of the body portion 3 an opening 7 and provide on the outer face of the upper wall an internally screw-threaded boss 8 into which a pipe (not shown) may be threadably received, the said pipe leading as usual to the cleaning blast port of a sanding valve such as is shown in the Ranson Patent No. 1,581,546, dated April 20, 1926.

The purpose and object of this last named construction is to permit a blast of air, as described in the Ranson patent, to be projected through the opening 7 and through the opening 5 so as to clean out the discharge pipe by means of which the port or opening 5 is connected to a point adjacent the rail either forwardly or rearwardly of one of the driving wheels of a locomotive or car.

The inlet leg 2, adjacent its outer extremity, is formed substantially as shown in the patent to Frantz et al. 1,864,057, dated January 21, 1932. That is to say, it is provided with an exteriorly threaded portion 9, and adjacent the inlet opening 10 it is formed with a segmental boss 11 against which the collar or union 12 is adapted to seat. The union 12 is provided at its lower end with a segmental curved surface substantially conforming to the outer face of the boss 11 and is further provided adjacent its extremity with a flange 13 against which the union nut 14 is adapted to engage and by means of which the union 12 is maintained in tight contact with the boss 11. It will be understood that the diameter of the opening 15 of the nut 14 is slightly greater than the external diameter of the union 12 and the threaded portion 9, as indicated by dotted lines, is provided with one or more vertical grooves 16 so that condensed water flowing down the outer face of the union 12 will be permitted to pass between the nut and the screw-threaded portion 9 of the trap inlet leg. By this construction all chance of seepage water entering the sand trap and causing the clogging of the sand is avoided.

The inlet leg is further provided at a point below the opening with a curved wall portion 17 and is provided on the opposite wall with a straight downwardly inclined surface 18, said surface merging at its opposite ends respectively into the side wall of the inlet leg and into the bottom wall 19 of the body portion of the trap 3 at a point adjacent the opening 20 in which is positioned the clean-out plug 21.

On the outer wall of the inlet leg 2 I provide a recess 22, the upper end of the recess leading to a screw-threaded opening 23 through which the actuating air is adapted to enter said recess 22, and I preferably provide, in connection with said opening, an inlet pipe 24 to the outer end of which is connected a pipe (not shown) leading from the operating port of the sanding valve illustrated in the said Ranson patent. The pipe 24 preferably comprises a plurality of sections 25 and 26 which are joined by a union 27, and interposed between the portions 25 and 26 is a strainer 28 through which the actuating air from the operating valve is required to pass. At the lower end of the opening 22 I provide an opening 29 leading to the outer face 30 of the trap and an opening 31 leading into the inclined wall 18 forming the lower portion of the inlet leg 2. The opening 31, adjacent its lower surface, is reduced in diameter by reason of the formation of said opening by a tapered tap through which, at the same time, the opening 31 is provided with a tapering thread.

The inner face of the opening 29 is screw-threaded, as indicated at 33, and the inner face of the opening 31 is provided, as above stated, with a tapered thread, as indicated at 34. The numeral 35 designates a bushing member having an inner tubular end adapted to be projected into the body portion 3 of the trap through the openings 29 and 31. Rearwardly of the tubular portion 36 I provide the bushing with spaced bands of increased diameter, the surface of each band being screw-threaded, as indicated by the reference character 37. The screw-threaded portions 37 are adapted to engage respectively with the screw-threaded portions 29 and 31, the inner or screw-threaded collar or band of the bushing being adapted, when in assembled position, to engage the threads 34 of the tapped opening 31 by means of which the inward movement of the bushing is limited, and the jamming of the threaded portion 37 in the cap threaded portion 34 causes the bushing to have an air tight fit with the inner wall of the opening 31 so that the actuating air entering the pipe 24 cannot escape between the threaded portion 37 of the inner collar of the bushing and the coacting threads 34 of the opening 31. The outer end of the bushing 35 preferably terminates short of the outer face 30 of the trap, and interposed between this outer end of the bushing and the outer extremity of the threaded portion 37 of the opening 29 I provide a packing member 38 and a jamb nut 39, the latter having an inclined inner face 32 adapted to engage the packing and force the same, when the parts are in assembled position, into tight engagement with the threaded portion 31 of the opening 29 and with the periphery of the nozzle member 41 to prevent any leakage of the actuating air to the outer face of the trap and at the same time securely hold the nozzle member 41 in position against vibration.

At its outer end the nozzle member 41 is provided with a tapered plug 42 adapted to close the outer end of the said nozzle and to prevent the escape of air therethrough. I preferably perforate the nozzle 41 and the plug 42 and pin the same together, as indicated at 43, to prevent independent rotation of the plug and nozzle and to cause the nozzle and plug to rotate as a unit. The plug 42 may be provided with a square end in order that, by the engagement of the square with a wrench, the nozzle 41 may be adjusted as hereinafter pointed out. At points spaced inwardly from the plug 42 I provide the exterior surface of the nozzle with a screw-threaded portion 44 of slightly increased diameter, the threads thereof being adapted to engage the threads 45 formed interiorly in the outer extremity of the bushing. The threaded portion 45 of the bushing terminates short of a series of openings 48 extending through the bushing and forming means for the admission of the actuating air to the interior of the bushing from the recess or chamber 22. It will be apparent that by rotating the plug 42 in a clockwise direction the nozzle will be forced inwardly of the bushing and by rotating the plug in the opposite direction the nozzle will be forced outwardly of the bushing, and the limit of movement of the nozzle is the distance the same can move along the threaded portion 45 of the said bushing. Inwardly of the threaded portion 44 the nozzle is slightly reduced in external diameter and there is interposed between the shoulder thus formed and a packing member 46 a spring 47, the packing member 46 being adapted to engage the inclined wall 46$^a$ formed interiorly in the bushing. The spring 47 is adapted, irrespective of the position of the nozzle, to exert sufficient pressure against the packing 46 to form an air-tight joint between the bushing and the nozzle at this point to prevent the escape of the actuating air between the periphery of the nozzle and the inner surface of the bushing. It will be obvious that the spring need only be sufficiently strong to maintain the parts in assembled position and that as soon as air is admitted into the chamber 22 and through the openings 48 into the interior of the bushing the air pressure bearing against the packing member will absolutely seal the packing member in its engagement with the inclined shoulder 46$^a$ and with the periphery of the nozzle.

At a point spaced inwardly from the threaded portion 44 the interior of the nozzle is reduced in diameter and provided with a threaded opening 49 to receive a jet device 49', preferably in form of a tapered plug having longitudinal and lateral openings 50 therein, the maximum diameter of the head of said plug being slightly less than the interior diameter of the nozzle so as to admit air into both the lateral and the longitudinal openings 50 therein. The longitudinal opening is such that the amount of air passing through the jet device into the chamber 51 can be predetermined at the time of manufacture. The chamber 51 is formed partially in the nozzle proper and partially in the nozzle extension 53 and terminates in a reduced cylindrical passage the inner end of which is adapted to be closed by the conical headed valve 52, the latter being maintained normally in closed position by means of the spring 57 interposed between the inner end of the chamber and a projection 56 on the stem of the valve 52. The extension 53 is preferably provided with a conical seat 54 to engage the conical head of the valve 52 and with a cylindrical passage 55 of increased diameter, as clearly shown in the drawings. The external diameter of the extension 53 is the same as the external diameter of the reduced portion of the nozzle, and hence it has a slidable fit within the extension of the housing member 36, the extension 53 being threadably received upon the reduced portion of the nozzle proper, the threadable connection between the nozzle proper and the extension forming convenient means for assembling and disassembling the valve 52 and valve spring 57. It should be noted that the reduced portion of the nozzle, which is surrounded by the spring 47, provides an elongated opening of sufficient extent to permit the actuating air from the chamber 22, which passes through the openings 48 in the housing member, to enter the openings 58 in the nozzle proper irrespective of the position of the nozzle between the limit stops formed by the shoulder adjacent the openings 48 at one end of the screw threaded portion 45 and the packing member 38 at the opposite end of the screw threads. It will also be noted that the chamber 22 completely surrounds the housing member so that all the openings 48 are in full communication with the chamber 22 at all times.

The projection 36 of the housing member extends into the trap body so that its inner end coincides with the inner end of the nozzle extension 53 when the same is moved to a point for maximum sand flow. The projection of the housing member is sufficient, therefore, to prevent, upon the removal of the nozzle, any inward flow of sand into the housing to a point sufficiently far to prevent the re-insertion and proper functioning of the nozzle, and hence it is unnecessary with applicant's improved nozzle and housing structure to prevent the inflow of sand to the body of a trap and clean the sand from the body of the trap upon the removal of the nozzle for renewal or cleaning of the parts. Where the housing for the nozzle terminates at a point short of the maximum calculated delivery capacity of the trap any substitution of a shorter nozzle than that supplied with the trap often results in causing, upon the actuation of the trap, a flow of sand much beyond the maximum intended and causes a serious waste of sand upon the operation of the trap.

In the form of device illustrated in Figure 2 I make no change in the trap body and hence have applied to the body the same reference characters used in connection with Figure 1. I preferably form the opening 23' with a standard thread and position in this opening a pipe 24' and at the outer end of the said pipe I insert a jet device corresponding in all details to the jet device 49'. The outer end of the pipe 24' is provided with a tapered thread 25' to which is connected a T-nipple 59, one arm of the T being provided with tapered threads 60 to which the pipe leading from the actuating port of the air valve (not shown) is adapted to be connected. The opposite arm of the T is provided with a threaded opening 61 into which is threadably received a plug 62 having a socket 63. Interposed between the inner end of the threaded portions 60 and 61 is a cylindrical strainer 64 through which the actuating air is required to pass. By utilizing a T-nipple and by providing the same with a cylindrical strainer it will be obvious that upon the removal of the plug 62 any accumulation of debris or scale on the inner face of the strainer may be removed by turning on the actuating air, and after the strainer is cleaned the plug 62 is returned to its original position.

The housing member 65, instead of being threadably received in the openings 29 and 31, has a tapered fit within the opening 31', the housing being adapted to be driven into the opening 31' so as to form an air-tight connection between the opening 31' and the outer circumference of the housing member. The housing is of less diameter than the opening 29 and is provided at its inner end with a series of longitudinal slots 66 so that the air in the chamber 22 may pass between the inner circumference of the threaded opening 29 and gain access to the interior of the housing member. The outer extremity of the housing member is internally threaded, as indicated at 67, the threaded portion extending inwardly of the housing and terminating at a shoulder 68. The shoulder forms the outer end of a portion 69 of reduced diameter which portion terminates in an inclined shoulder 70 the purpose and object of which will hereinafter be described. The nozzle 71 preferably comprises a main portion 72 and an extension member 73. Exteriorly of the member 72 the same is provided with a screw-threaded collar 74 adapted to threadably engage the internal threaded portion of the housing so as to permit, by the rotation of the nozzle, the adjustment of the same longitudinally of the body portion 3 of the trap. At the outer end of the collar 74 the nozzle is provided with a series of radial openings 75 to provide a pathway for the actuating air from the chamber 22 through the opening 29, through the slotted portions 66, and from the interior of the housing into the interior of the nozzle.

Immediately inwardly of the openings 75 I provide on the interior of the nozzle a conical seat 76 upon which is normally seated a similarly formed valve 77. The stem of the valve projects inwardly and between a nut 78 and the seat 76 is interposed a spring 79 adapted to normally maintain the valve in a closed position. Inwardly of the valve I provide the inner surface of the nozzle portion 72 with a tapped thread 80 into which is received the correspondingly formed outer end of the extension 73. Since the extension is of less diameter than the main portion 72 there is a shoulder provided by the end of the portion 72 and interposed between the shoulder thus formed and the inclined shoulder 70 of the housing, and I provide a spring 81 and a packing member 82 adapted to form a tight joint between the housing and the nozzle extension 73. The outer end of the nozzle portion 72 is provided with a tapered closure plug 83, the latter being maintained in fixed position by means of a rod 84 adapted to extend through aligned openings in the nozzle and plug. The rod 84 extends outwardly of the jamb nut 39 and forms a convenient means for rotating the nozzle to adjust the same as set forth in my description of the previous figure.

While I have shown the nozzle threadably received within the housing members in both forms of my device, it will be readily apparent to those skilled in this particular art that by tightening the jamb nut 39 and forcing the packing 38 into intimate contact with the nozzle member if it is desired the threaded connections between the nozzle and the housing can be omitted and a sliding fit provided in place thereof. Under these conditions the nozzle may be moved by giving the same a slight rotation to break the friction grip between the packing and the outer circumference of the nozzle after which the nozzle may be moved inwardly or outwardly as desired within the limits of its adjustment.

It will be noted that the housing member, in both forms of my device illustrated, after being seated, forms in effect an integral portion of the trap. That is to say, the housing member, being properly positioned at the factory, remains in such proper position during the life of the trap, whereas the nozzle member is freely adjustable so as to control the flow of sand from the outlet opening of the trap, and in both forms of my device is freely removable from the housing upon the removal of the packing nut and packing so that the nozzle may be disassembled, cleaned or new parts substituted and the nozzle replaced with minimum effort and without the necessity of the removal of the trap or other associated parts.

From the foregoing description, taken in connection with the accompanying drawings, it will be apparent that I have provided a nozzle which may be readily adjusted as to the extent of the projection of the same within the body of a sand trap and that such adjustment can be made while normal actuating air is admitted into the trap so that it is possible, during the operation of the trap, to adjust the projection of the nozzle to regulate the flow of sand through the opening 5 to the desired extent and that such adjustments may be made without releasing the parts of the mechanism which maintain airtight connection between the recess 22 and the sanding nozzle assembly.

Having thus described my invention, what I claim is and desire to secure by Letters Patent is:

1. A sand trap assembly comprising a sand trap body provided with an inlet leg for sand and an outlet opening, and an air blast nozzle entering said body beneath the inlet leg and extending toward said outlet opening said nozzle comprising a fixed hollow member and a tubular member, the latter being slidably fitting in and movable longitudinally of the hollow member to adjust the extension of the tubular member into said body, said tubular member being movable, while said trap assembly is operating under normal conditions.

2. A sand trap assembly comprising a trap body provided with an outlet opening, an inlet leg leading to said body, an air blast nozzle entering said body adjacent the juncture of said leg and body housing means surrounding said nozzle, said nozzle being movable with reference to said body and housing to control the flow of sand therefrom, and means for causing said nozzle to move longitudinally of said body, said means being operable during the normal operation of said assembly.

3. A sand trap assembly comprising a trap body having an inlet leg for sand and an outlet opening, a chamber formed exteriorly of said inlet leg, an air supply pipe entering said chamber, a sanding nozzle intersecting said chamber, said nozzle being movable longitudinally with respect to said body to control the flow of sand to said outlet opening, a portion of said nozzle projecting into said body toward said outlet opening, and means for causing said nozzle to move longitudinally of said body to control the extent of projection thereof into said body, said means being operable during the normal operation of said assembly.

4. A sand trap assembly comprising a trap body provided with an inlet leg for sand and an outlet opening, a chamber formed exteriorly of said inlet leg, an air blast pipe entering said chamber, a bushing member intersecting said chamber and extending into openings provided in the opposite walls thereof, said bushing having a projection extending into said trap body, means for preventing the escape of actuated air between said bushing and said respective openings, a nozzle for controlling the flow of sand through said outlet opening, said nozzle being movable with respect to said bushing whereby the extent of projection of said nozzle into said body may be varied, inlet means formed in said bushing and nozzle, said openings communicating with each other and with said chamber, and means for moving said nozzle longitudinally in respect of said bushing, said last named means being operable when said assembly is operating under normal conditions.

5. A sand trap assembly comprising a trap body having an upright inlet leg and an outlet opening therein, a chamber formed exteriorly of said inlet leg, means for connecting said chamber to an air supply source, a cylindrical bushing member intersecting said chamber, one portion of said bushing fitting an opening formed in the wall of said inlet leg, said portion extending into the body of said trap, said bushing being provided with a plurality of radial inlet ports communicating with said chamber, an air blast nozzle threadably received within said bushing, packing members engaging the exterior surface of said nozzle at spaced points to prevent the leakage of air, and means for rotating said nozzle between predetermined limits for adjusting the extension of the inner end of said nozzle in respect of said bushing, the extent of projection of said nozzle in respect of said bushing being adjustable while actuated air is passing therethrough.

6. A sand trap assembly comprising a trap body provided at one end with an inlet leg for sand and at its opposite with an outlet opening, a chamber formed exteriorly of said inlet leg, an opening communicating with said chamber and trap body, said chamber having an additional opening communicating with a source of actuated air, a fixed housing associated with said second named opening into said trap body, a nozzle slidably fitting within said housing and being movable relative thereto, means for admitting air from said chamber to said nozzle through said housing, and means movable with said nozzle and interposed between said air supply source and said trap body for limiting the amount of air passing through said nozzle.

VIRGIL L. FRANTZ.